Feb. 10, 1948. A. H. GREUBEL 2,435,827
AIRPLANE WHEEL INCORPORATING A LOW-PRESSURE FLUID MOTOR
Filed Sept. 27, 1943 2 Sheets-Sheet 1
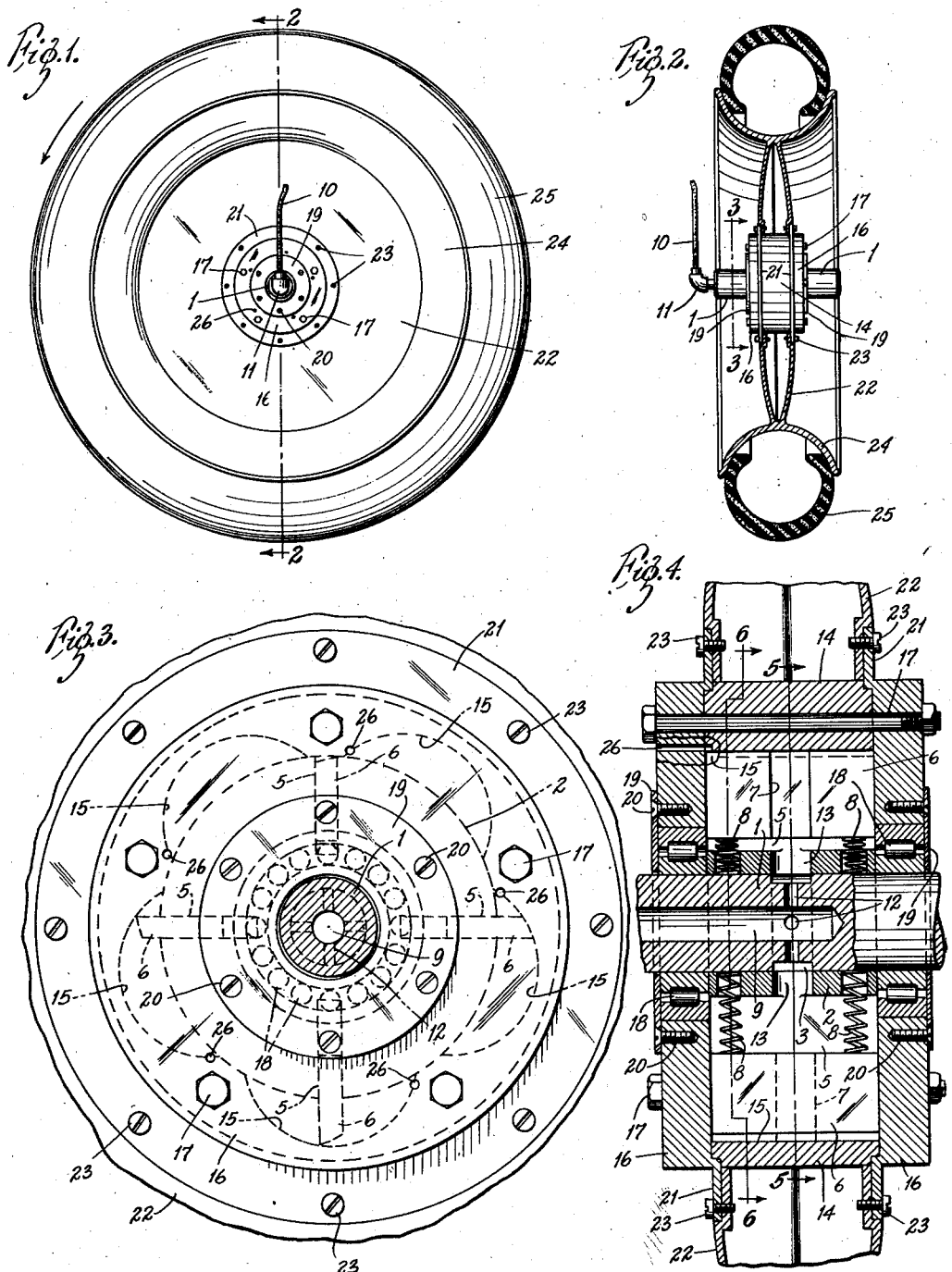
INVENTOR:
ALFRED H. GREUBEL,
BY Kingsland, Rogers & Egell,
ATTORNEYS.

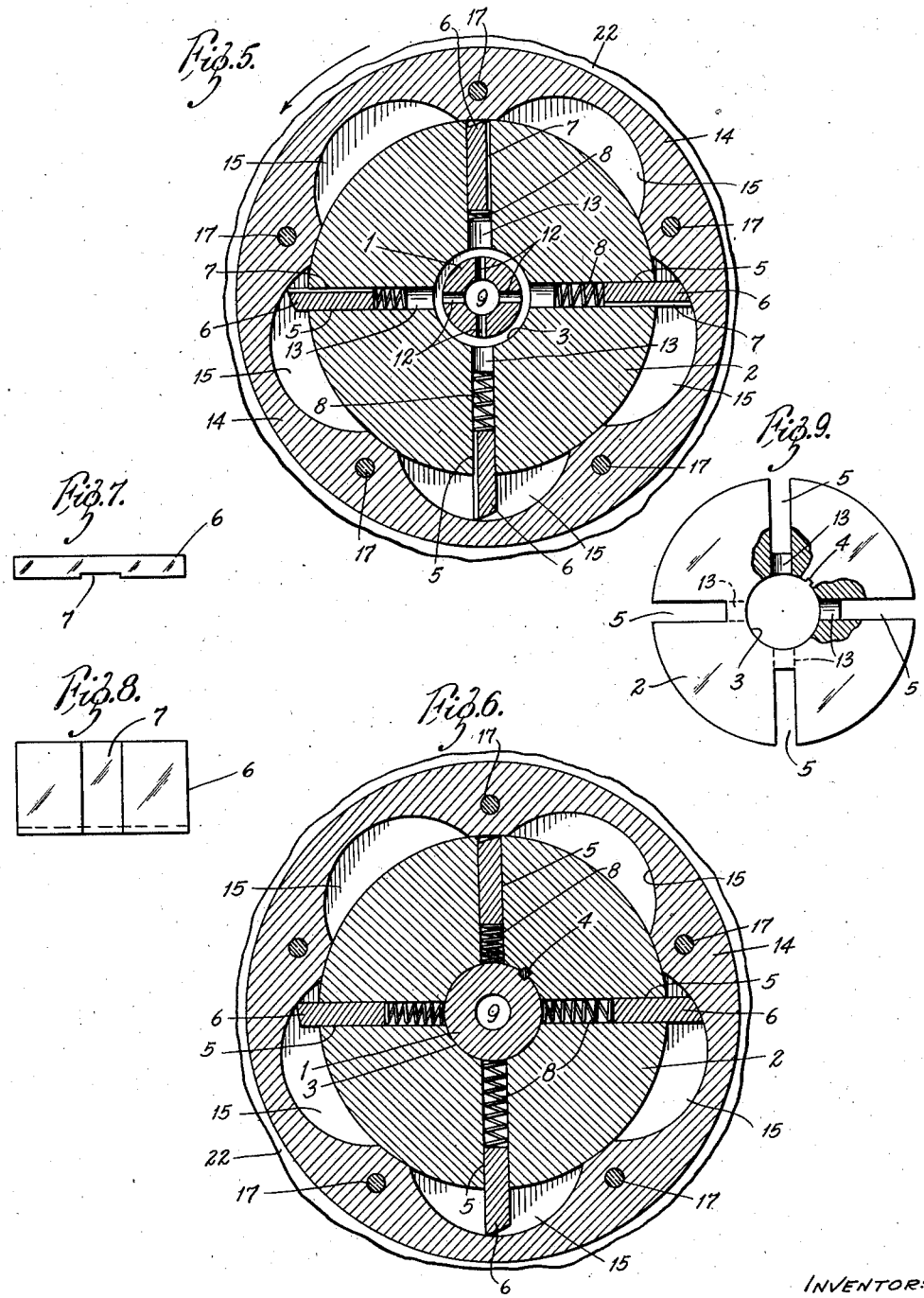

Patented Feb. 10, 1948

2,435,827

UNITED STATES PATENT OFFICE 2,435,827

AIRPLANE WHEEL INCORPORATING A LOW-PRESSURE FLUID MOTOR

Alfred H. Greubel, Affton, Mo., assignor to Z B Inc., St. Louis, Mo., a corporation of Missouri Application September 27, 1943, Serial No. 503,933

6 Claims. (Cl. 244—103)

This invention relates to airplane landing gear, and more particularly to means for rotating landing wheels of airplanes.

The desirability of a suitable device to impart to the landing wheels of an airplane a rotation prior to the contact of the wheels with the ground has been recognized as highly desirable. Upon landing with the landing wheels in a nonrotating state, there is a substantial time interval during which, due to inertia, the wheels drag or slide upon the landing surface. This results in a substantial wear each time the plane lands, upon the tread of the pneumatic tires of the landing wheels. This undue and wasteful wear can to a large degree be avoided, by imparting to wheels prior to landing a rotation at a speed sufficient, in order that the peripheral speed thereof will approximate ground or landing speed of the plane at the time the landing is made.

One of the primary objects of the present invention is to provide a simplified construction for the purpose of imparting a controlled initial rotation to the landing wheels prior to making ground contact, that may be built into the landing gear structure, and which may be operated, under accurate control, from the available power plant of the airplane.

A more specific object is to provide for each landing wheel a stator and a rotor member in which is incorporated a motor operated by vacuum generated by the intake engine or motor of the airplane power plant, whereby this power source may be utilized during landing to rotate the landing wheels.

Another object is to provide an efficient and simplified power unit that may be incorporated in the usual landing gear construction without radical change in design, and which will not materially increase the weight thereof, and which may be employed without any additional operating power equipment.

Additional detailed advantages will be apparent from the following detailed description, taken in connection with the accompanying drawings, in which:

Fig. 1 is a side view of the wheel structure;

Fig. 2 is a cross section taken substantially on the line 2—2 of Fig. 1;

Fig. 3 is a sectional view taken on the line 3—3 of Fig. 2, showing in dotted relation certain of the parts of the wheel operating mechanism;

Fig. 4 is a cross section through the same parts as shown in Fig. 3;

Fig. 5 is a vertical section on the line 5—5 of Fig. 4;

Fig. 6 is a vertical section substantially on the line 6—6 of Fig. 4;

Fig. 7 is a detailed end view of one of the vanes of the operating means for the wheel;

Fig. 8 is a side view of the same; and

Fig. 9 is an end view partially in section of the stator member on the vacuum motor constituting the operating means for the wheel structure.

In the embodiment of the invention illustrated in the drawings, I have disclosed only one wheel structure, which it will be understood is duplicated in the landing gear of the airplane to provide the usual number of landing wheels employed in standard constructions.

The structure of the invention includes a shaft 1, which is mounted in any standard element of the landing gear, for example in a wheel fork (not shown) which, in turn, is suitably supported in the frame work of the airplane. This shaft is nonrotatable and carries a cylindrical member, shown in detail in Fig. 9, and consisting of the cylindrical body 2 having a central bore 3 that fits over the shaft 1 with which it is permanently connected by a key and key-way construction 4. In the periphery of the member 2, are formed a series of channels 5 that extend transversely across the body 2 and the side faces thereof. The channels 5 are disposed at right angles to each other. It will be understood that the construction described constitutes a rigid nonrotatable stator member in which a series of vanes 6 are seated, said vanes comprising substantial rectangular blades, preferably of Bakelite or similar material. Each vane is provided with a transverse groove 7 extending substantially midway of the length of the vane from the top to the bottom edge thereof.

The channels 5 do not extend the entire depth from the periphery of the body 2 to the central bore 3, so that, in effect, they constitute recesses in which the vanes 6 seat, as most clearly illustrated in Figs. 5 and 6.

Expansion springs 8 are interposed between the bottom wall of the channels 5, and the lower edge of each vane, the said springs being preferably arranged so that a pair of springs is provided for each vane, and the said springs being spaced apart so that they contact the respective vanes near each extremity thereof, as is clearly illustrated in Fig. 4. Obviously, the tendency of the springs is to press the vanes outwardly beyond the periphery of the body 2.

The shaft 1 has a central bore 9 that extends inwardly from one end of the shaft to a point beyond the intermediate length thereof, as clearly shown in Fig. 4. This bore constitutes a conduit, the external end of which is connected with a flexible conduit 10 by fitting 11. The conduit 10 is in communication with a manifold (not shown) which, in turn, connects with the intake of the several engines of the power plant of the airplane.

Near the inner end of the bore 9 are a series of transverse passages 12 arranged at right angles to each other and communicating, respectively, with openings 13 formed so that they extend inwardly from the bore 3 of the body 2, and communicate with the bottom of the channels 5 substantially intermediate of their length, so that the passageways 12 and 13 provide communication from the conduit 9 into the passage formed by the grooves 7 in the vanes 6. The parts just described form a continuous conduit or passageway from the flexible conduit 10 through to the periphery of the body 2, behind each vane to provide a vacuum pull within said passageway.

A rotor in the form of a hollow cylindrical body 14 is arranged for rotation in respect of the body 2. The member 14 has its internal surfaces formed to provide spaced concave chambers 15, that are struck on radii so that the spacing of said chambers 15, in relation to the vanes 6, is such that the vanes coact with a plurality of said chambers to separate them into compartments. As clearly illustrated in Figs. 5 and 6, the number of chambers 15 are in excess of the number of vanes so that, when the member 14 is assembled with the member 2, a plurality of the vanes will be in cooperative relationship with the chambers 15, whereby any dead center adjustment will be avoided, and more than one of the chambers 15 will be active.

The ends of the chambers 15 are closed by end plates 16 in the form of ring structures. The end plates 16 are operatively connected with the member 14 by tie rods 17 that clamp the end plates 16 in place. The member 14 and the end plates 16 rotate as a unit on the shaft 1, and, in order to reduce the friction, anti-friction devices are interposed between the inner periphery of the ring structure of the end plates 16, and the periphery of the shaft 1. As illustrated in the drawings, these anti-friction devices comprise roller bearings 18 located as illustrated in Fig. 4 on opposite sides of the rotor structure that includes the member 14 and the end plates 16. Retaining rings 19 for the roller bearings 18 may be employed, if desired, as illustrated particularly in Fig. 4, said retaining rings being held in place by screws 20.

Each of the rings 16 may be provided with outwardly extending flanges 21 constituting supports for the spoke structure 22 of the wheel, said spoke structure being releasably secured to the flanges 21 by screws 23. The spoke structure supports at its outer extremity a tire rim 24 upon which a pneumatic tire 25 is mounted.

Each of the chambers 15 at its forward end is vented to atmosphere by a passageway 26 formed through one of the plates 16 and into the adjacent edge of the wall forming the respective chambers 15, the vent preferably being located as clearly illustrated in Figs. 3 and 4, at the forward edge of each chamber 15.

*Operation*

Prior to the landing of the airplane, a vacuum is drawn into the flexible conduit 10 by communicating the conduit with the intake of the engine or engines comprising the power plant of the plane. Inasmuch as the conduit 10, through the passageways described, is in communication with the compartment in the chambers 15 on the trailing faces of the respective vane 6, a vacuum will be established in such compartment. Inasmuch as the opposite side of each of the vanes forms a compartment that is vented to atmosphere, the pressure therein will be relatively high in respect of the pressure in the compartment on the trailing faces of the vane. This pressure differential causes the rotation of the member 14 and the side plates 16 associated therewith (in the direction of the arrow in Fig. 1), and thereby a rotation of the wheel structure that is supported by said plates 16.

The speed of rotation can be controlled by throttling of the communication with the engine intake, so that the differential pressure between the compartments formed in the chambers 15 by the cooperation of the vanes 6, may be regulated. The power generated by the vacuum produced, as described, will be sufficient to overcome the inertia of the landing wheels, and to give them a speed of rotation that may be regulated by the operator, so that it will approximate the ground speed of the plane when contact with the wheels of the landing gear is made with the runway or ground surface.

The obvious advantages of the construction will be plain from the description, and it will be appreciated that the structure is one that may be readily incorporated as a part of the standard landing gear on airplanes, and, that by utilizing the vacuum created by the engine intake only during the period of landing, the efficiency of the power plant of the airplane will not be impaired.

I am aware that the invention may be modified in numerous particulars without departing from the spirit and scope of the invention.

What I claim and desire to secure by Letters Patent is:

1. In an airplane landing gear having revoluble landing wheels, a fluid motor adapted to supply power to rotate said wheels when free from ground friction, said motor comprising a stator member adapted to constitute the axle of a wheel structure, a rotor member operatively mounted on said stator adapted to constitute the hub of the wheel structure and having a plurality of concave chambers formed therein, side members sealing the side openings of said chambers, a series of vanes mounted in the stator and slidable radially from the periphery thereof contacting the concave walls of said chambers, and means for establishing a differential pressure on opposite sides of said vanes to rotate said rotor.

2. In an airplane landing gear having revoluble landing wheels, a fluid motor comprising a stator member forming a rigid axle support for the wheel structure, a rotor member adapted to serve as the hub of the wheel structure, and having a plurality of concave spaced periphery chambers, members closing the ends of said chambers to seal the same, a series of vanes slidably mounted in the periphery of said stator the number of said vanes being an odd number in respect of the number of said chambers, means for actuating said vanes outwardly from the periphery of said stator to contact the outer ends thereof resiliently against the concave walls of said chambers, and means for establishing a differential pressure on opposite sides of said vanes to rotate said rotor.

3. In an airplane landing gear having revoluble landing wheels, a fluid motor comprising a stator member forming a rigid axle support for the wheel structure, a rotor member adapted to serve as the hub of the wheel structure, and having a plurality of concave spaced periphery chambers, members closing the ends of said chambers to seal the same, anti-friction devices between said rotor and said stator, a series of vanes slidably mounted in the periphery of said stator the number of said vanes being an odd number in respect of the number of said chambers, means for actuating said vanes outwardly from the periphery of said stator to contact the outer ends thereof resiliently against the concave walls of said chambers, and means for establishing a differential pressure on opposite sides of said vanes to rotate said rotor.

4. A fluid motor adapted to constitute the power unit of a wheel structure, comprising a cylindrical stator member adapted to constitute the axle of the wheel structure and having a plurality of transverse recesses extending from the periphery thereof radially inwardly and terminating a distance from the axis thereof, sliding plates constituting vanes slidably mounted in said recesses, means for actuating said plates outwardly, a cylindrical rotor member mounted over the periphery of said stator member said rotor member having a series of spaced convex chambers formed in the periphery thereof, means for sealing the side faces of said rotor member, a conduit in communication with the chambers formed in said rotor member for establishing a differential pressure on opposite sides of said vanes, and means for controlling said conduit whereby one or more of said chambers will be in communication therewith irrespective of the relative position of said motor and said stator.

5. In combination, airplane landing wheel construction comprising a shaft nonrotatably supported, a vacuum actuated motor mounted on said shaft, said motor including a stator secured to the shaft against rotation having a plurality of vanes biased outwardly, a rotor surrounding said stator and having bearing support on said shaft, a landing wheel supported by said rotor, said rotor including an inner surface having spaced concave indentations and defining with the periphery of the stator a plurality of chambers, said outwardly biased vanes contacting the said inner surface of said rotor, means for establishing a vacuum on one side of each of said vanes by the engine of the airplane, means venting the chambers to atmosphere, and control means for establishing said vacuum at the desire of an operator.

6. In combination, airplane landing wheel construction comprising a hollow shaft nonrotatably supported, a vacuum actuated motor mounted on said shaft, said motor including a stator secured to the shaft against rotation having a plurality of vanes biased outwardly, a rotor surrounding said stator and having bearing support on said shaft, a landing wheel supported by said rotor, said rotor including an inner surface having spaced concave indentations and defining with the periphery of the stator a plurality of chambers, said outwardly biased vanes contacting the said inner surface of said rotor, means for establishing a vacuum on one side of each of said vanes by the engine of the airplane including a vacuum drawing line from the engine to said hollow shaft and passageways through the wall of said shaft, through the stator, and along one face of said vanes, means venting the chambers to atmosphere, and control means for establishing said vacuum at the desire of an operator.

ALFRED H. GREUBEL.

REFERENCES CITED

The following references are of record in the file of this patent:

UNITED STATES PATENTS

| Number | Name | Date |
| --- | --- | --- |
| 2,335,398 | Downey | Nov. 30, 1943 |
| 868,841 | Calkins | Oct. 22, 1907 |
| 1,322,107 | Gressle | Nov. 18, 1919 |
| 1,895,452 | Dormoy | Jan. 31, 1933 |
| 1,021,338 | Rush | Mar. 26, 1912 |